No. 718,467. PATENTED JAN. 13, 1903.
N. JOHNSTON.
REIN GUIDE.
APPLICATION FILED MAY 28, 1902.
NO MODEL.
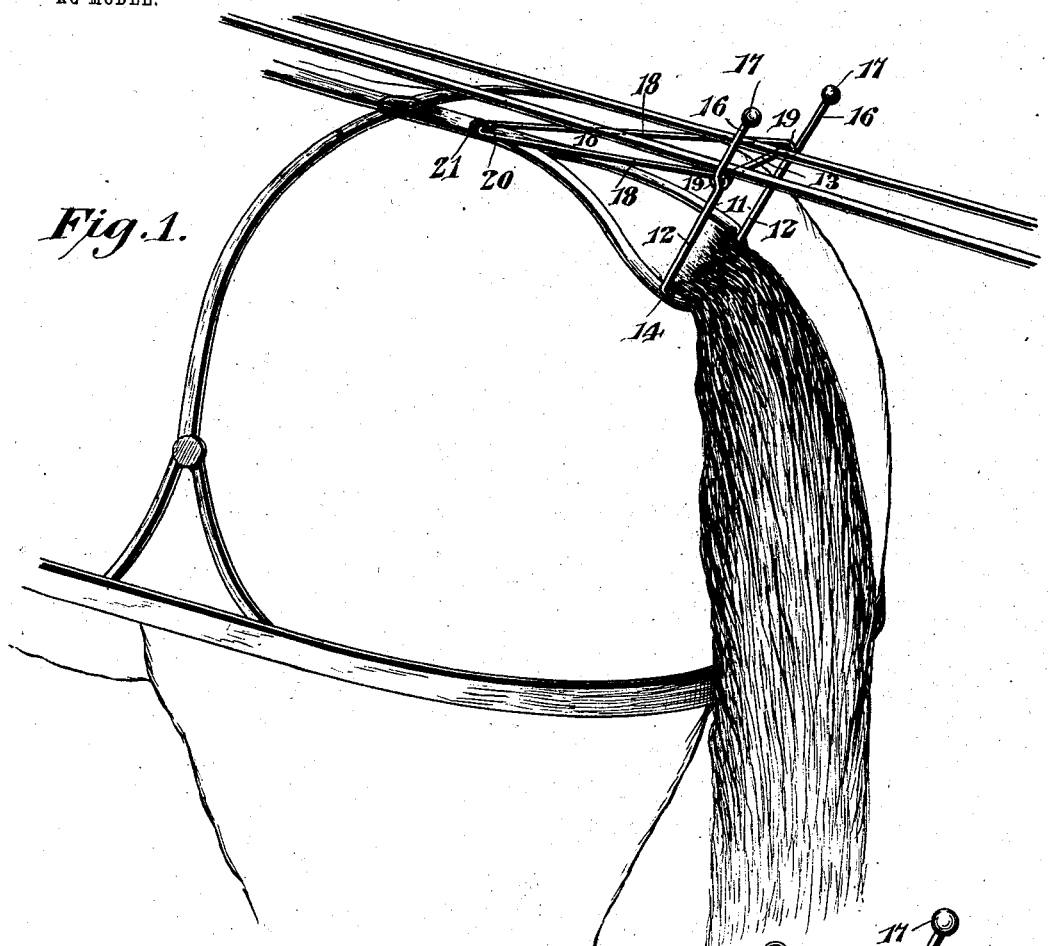
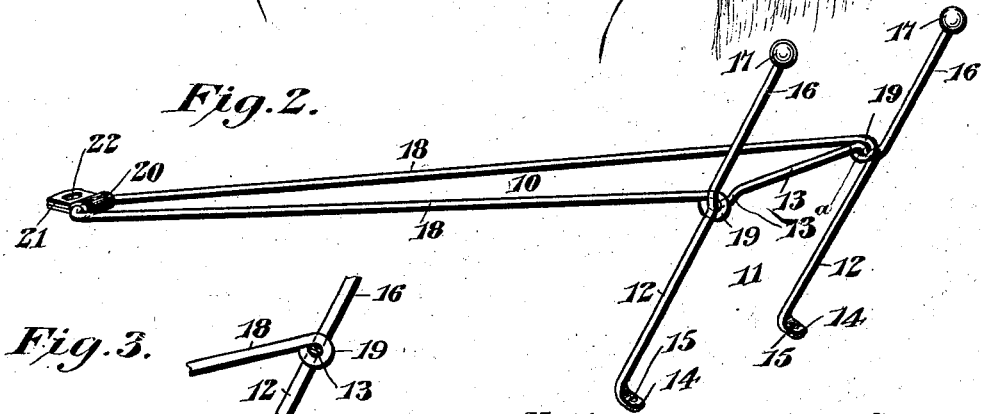
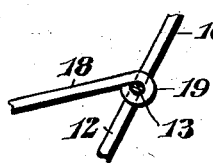
Nathan Johnston, Inventor.
Witnesses

UNITED STATES PATENT OFFICE.

NATHAN JOHNSTON, OF EGAN, TEXAS.

REIN-GUIDE.

SPECIFICATION forming part of Letters Patent No. 718,467, dated January 13, 1903.

Application filed May 28, 1902. Serial No. 109,365. (No model.)

*To all whom it may concern:*

Be it known that I, NATHAN JOHNSTON, a citizen of the United States, residing at Egan, in the county of Johnson and State of Texas, have invented a new and useful Rein-Guide, of which the following is a specification.

The present invention relates to rein-guides, the object, broadly stated, being to provide a simple article which will support the reins of a harness so as to prevent the horse switching his tail over the same.

One of the features of the invention resides in the construction of an article of the above character which may be attached to the crupper or other part of the harness and is made up of relatively movable parts that may be folded so as to occupy very little space during storage and transportation and which when in use will yield to the motions of the horse and will not interfere with the harnessing or unharnessing of the same.

The preferred form of construction is shown in the accompanying drawings, wherein—

Figure 1 is a perspective view of the rear portion of a harnessed horse, showing the improved rein-guide applied to the crupper. Fig. 2 is a perspective view, on an enlarged scale, of said guide. Fig. 3 is a detail sectional view through the cross-bar.

Similar numerals of reference designate corresponding parts in all the figures of the drawings.

The guide, as shown, comprises two members—a brace-frame 10 and a guide-frame 11. The guide-frame comprises two upright spaced standards 12, connected intermediate their ends by a cross-bar 13, the lower terminals of said standards being offset and flattened, as shown at 14, and having openings 15, through which rivets or other suitable fastening devices may be passed. The portions of these standards above the cross-bar 13 constitute guide-arms 16, and their upper ends may be suitably ornamented, as shown at 17. These guide-arms 16, furthermore, are preferably offset from the remaining portions of the standards.

The brace-frame 10 comprises a substantially V-shaped wire, the side arms 18 of which have terminal eyes 19, formed by looping the ends of the wire about the cross-bar 13 of the guide-frame, as will be seen in Fig. 3, thus forming a pivotal connection between said guide-frame and brace-frame. The ends of the cross-bar are provided with seats 13ª, in which the eyes 19 are mounted. The contracted end of the brace-frame is surrounded by a sheet-metal ear 20, having an attaching projection 21, provided with a rivet-receiving opening 22.

The manner of using the device will be readily understood by reference to Fig. 1. The lower ends of the standards 12 are riveted to opposite sides of the crupper-loop, while the free end of the brace-frame is pivotally attached to the crupper-strap by means of the ear 16 at the upper or forward end of said crupper-loop. The reins are passed between the guide-arms 16 and rest upon the cross-bar 13 and are thus elevated directly above the root of the horse's tail in such a position that the horse cannot switch his tail over said reins. It will be seen that the article is very simple and inexpensive to construct, and because of the pivotal connection it will yield to the motions of the horse. Furthermore, during the harnessing or unharnessing operation it will not interfere with the application or removal of the crupper, because of the pivotal connections above described. These pivotal connections, furthermore, are advantageous, as they permit the folding of the elements, so that the guide will occupy very little room during storage or while in transportation.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. The combination with a harness-crupper loop, of an upright guide-frame comprising standards having their lower ends attached to opposite portions of said loop, and an intermediate connection between the standards, the portions of said standards above the connection constituting guide-frames, and a brace pivoted to the guide-frame and having its front end secured to the forward portion of the crupper in front of the guide-frame.

2. In a rein-guide, the combination with a brace, of a guide-frame pivotally connected intermediate its ends to the brace and having a standard, the lower end of said standard being arranged to be secured to the crupper of a harness, the portion of said standard above the brace constituting a guide-arm.

3. In a rein-guide, a guide-frame comprising a pair of upright standards connected intermediate their ends by a cross-bar, and a brace pivoted to the cross-bar.

4. In a rein-guide, the combination with a guide-frame comprising a pair of upright standards and a cross-bar connecting the standards intermediate their ends, of a brace-frame comprising a looped wire the terminals of which have eyes in which the cross-bar is revolubly mounted, and means for attaching the lower ends of the standards and the free end of the brace-frame to a harness.

5. The combination with a harness-crupper, of spaced upright standards the lower ends of which are secured to opposite sides of the crupper-loop, a cross-bar connecting the standards at intermediate points, a substantially V-shaped brace-frame having terminal eyes through which the cross-bar is passed, and an ear surrounding the contracted end of the brace-frame and attached to the crupper-strap contiguous to the loop.

In testimony that I claim the foregoing as my own I have hereto affixed my signature in the presence of two witnesses.

NATHAN JOHNSTON.

Witnesses:
W. A. KEMP,
ROBT. S. HAWES.